United States Patent
Åström et al.

(10) Patent No.: US 12,262,321 B2
(45) Date of Patent: Mar. 25, 2025

(54) WUS SIGNAL DESIGN

(71) Applicant: Telefonaktiebolaget LM Ericsson (publ), Stockholm (SE)

(72) Inventors: Magnus Åström, Lund (SE); Anders Wallén, Ystad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 460 days.

(21) Appl. No.: 17/608,672

(22) PCT Filed: May 13, 2020

(86) PCT No.: PCT/EP2020/063347
§ 371 (c)(1),
(2) Date: Nov. 3, 2021

(87) PCT Pub. No.: WO2020/229547
PCT Pub. Date: Nov. 19, 2020

(65) Prior Publication Data
US 2022/0217632 A1     Jul. 7, 2022

Related U.S. Application Data

(60) Provisional application No. 62/847,636, filed on May 14, 2019.

(51) Int. Cl.
*H04W 52/02* (2009.01)
*H04J 13/00* (2011.01)
(Continued)

(52) U.S. Cl.
CPC ..... *H04W 52/0229* (2013.01); *H04J 13/0062* (2013.01); *H04W 68/005* (2013.01); *H04W 72/0446* (2013.01); *H04W 72/0453* (2013.01)

(58) Field of Classification Search
CPC ........... H04W 52/0229; H04W 68/005; H04W 72/0446; H04W 72/0453; H04W 52/0235;
(Continued)

(56) References Cited

U.S. PATENT DOCUMENTS

2011/0103250 A1* 5/2011 Li .................... H04L 5/0023
370/252
2017/0223652 A1* 8/2017 Ko .................... H04W 56/0035
(Continued)

FOREIGN PATENT DOCUMENTS

| CN | 105409287 A | 3/2016 |
| CN | 108112077 A | 6/2018 |

(Continued)

OTHER PUBLICATIONS

International Search Report and Written Opinion dated Oct. 19, 2020 for International Application No. PCT/EP2020/063347 filed May 13, 2020, consisting of 16-pages.
(Continued)

*Primary Examiner* — Dinh Nguyen
(74) *Attorney, Agent, or Firm* — Weisberg I.P. Law, P.A.

(57) ABSTRACT

A method of a network node arranged for wireless communication with wireless communication devices is for transmission of a signal to the wireless communication devices. The method includes receiving, from another network node, a paging message intended for a wireless device belonging to a first group of wireless devices, determining, from the received paging message, a signal resource allocation and the group of the wireless device, determining a signal sequence based on the signal resource allocation and the group of the wireless device, and transmitting the signal comprising the determined signal sequence using the determined signal resource allocation. Methods for network nodes and wireless communication devices are disclosed, as
(Continued)

well as network nodes and wireless devices, and computer programs therefor.

28 Claims, 6 Drawing Sheets

(51) Int. Cl.
  *H04W 68/00* (2009.01)
  *H04W 72/0446* (2023.01)
  *H04W 72/0453* (2023.01)
(58) Field of Classification Search
  CPC ..... H04W 4/70; H04W 76/28; H04W 72/044; H04W 72/23; H04J 13/0062; H04L 5/0053; Y02D 30/70
  See application file for complete search history.

(56) References Cited

U.S. PATENT DOCUMENTS

| | | | | |
|---|---|---|---|---|
| 2017/0280336 | A1* | 9/2017 | Sun | H04W 74/006 |
| 2018/0359723 | A1* | 12/2018 | Worrall | H04W 74/0833 |
| 2019/0090190 | A1 | 3/2019 | Liu et al. | |
| 2019/0349856 | A1* | 11/2019 | Liu | H04W 52/0216 |

FOREIGN PATENT DOCUMENTS

| | | |
|---|---|---|
| CN | 109586840 A | 4/2019 |
| WO | 2018170896 A1 | 9/2018 |
| WO | 2018172347 A1 | 9/2018 |
| WO | 2018175760 A1 | 9/2018 |

OTHER PUBLICATIONS

3GPP TS 36.211 V15.5.0; 3rd Generation Partnership Project; Technical Specification Group Radio Access Network; Evolved Universal Terrestrial Radio Access (E-UTRA); Physical channels and modulation (Release 15), Mar. 2019, consisting of 238-pages.
3GPP TS 36.331 V15.5.1; 3rd Generation Partnership Project; Technical Specification Group Radio Access Network; Evolved Universal Terrestrial Radio Access (E-UTRA); radio Resource Control (RRC); Protocol specification (Release 15), Apr. 2019, consisting of 24-pages.
3GPP TS 36.213 V15.5.0; 3rd Generation Partnership Project; Technical Specification Group Radio Access Network; Evolved Universal Terrestrial Radio Access (E-UTRA); Physical layer procedures (Release 15), Mar. 2019, consisting of 552-pages.
3GPP TS 36.304 V15.2.0; 3rd Generation Partnership Project; Technical Specification Group Radio Access Network; Evolved Universal Terrestrial Radio Access (E-UTRA); User Equipment (UE) procedures in idle mode (Release 15), Dec. 2018, consisting of 55-pages.
3GPP TSG-RAN WG1 Meeting #97 R1-1905956; Title: UE-group wake-up signal in LTE_MTC; Agenda Item: 6.2.1.1; Source: Ericsson; Document for: Discussion, Decision; Date and Location: May 13-17, 2019, Reno, USA, consisting of 12-pages.
3GPP TSG RAN WG1 Meeting #96 R1-1902209; Title: UE-group wake-up signal for eMTC; Agenda Item: 6.2.1.1; Source: Samsung; Document for: Discussion and decision; Date and Location: Feb. 25-Mar. 1, 2019, Athens, Greece, consisting of 4-pages.
3GPP TSG-RAN WG1 Meeting #96bis R1-1903882; Title: UE-group wake-up signal in LTE-MTC; Agenda Item: 6.2.1.1; Source: Ericsson; Document for: Discussion, Decision; Date and Location: Apr. 8-12, 2019, Xi'an, P.R. China, consisting of 16-pages.
3GPP TSG RAN WG1 Meeting #97 R1-1907192; Title: UE-group wake-up signal for NB-IoT; Agenda Item: 6.2.2.1; Source: Sony; Document for: Discussion and Decision; Date and Location: May 13-17, 2019, Reno, USA, consisting of 5-pages.
3GPP TSG-RAN WG1 Meeting #93 R1-1805855; Title: Wake-up signal configurations and procedures for NB-IoT; Agenda Item: 6.2.7.1.1.2; Source: Ericsson; Document for: Discussion and Decision; Date and Location: May 20-24, 2018, Busan, Korea, consisting of 9-pages.
Chinese Office Action and English Summary dated Jan. 22, 2024 for Application No. 202080035505.5, consisting of 14 pages.
3GPP TSG RAN WG1 Meeting #88bis R1-1705204; Title: MTC UE Power Consumption Reduction in Idle Mode Paging; Agenda Item: 7.2.6.2; Source: Sony; Document for: Discussion / Decision; Location and Date: Spokane, USA, Apr. 3-7, 2017, consisting of 4 pages.
3GPP TSG-RAN WG1 Meeting #90bis R1-1717010; Title: Wake-up signal configurations and procedures; Agenda Item: 6.2.6.1.1.2; Source: Ericsson; Document for: Discussion and Decision; Location and Date: Prague, Czech Republic Oct. 9-13, 2017, consisting of 5 pages.
Indian Examination Report dated Jun. 13, 2022 for Application No. 202147057246, consisting of 6 pages.
Chinese Office Action and English Summary dated Jul. 10, 2024 for Application No. 2020800355055, consisting of 6 pages.
Korean Office Action and English Language Translation dated Sep. 22, 2024 for Application No. 9-5-2024-079915553, consisting of 14 pages.
3GPP TSG RAN WG2 Meeting # 102 R2-1807524 Revision of R2-1804897; Title: Open issue in WUS; Source: Intel Corporation; Agenda item: 9.13.9; Document for: Discussion and decision; Date and Location: Busan, Republic of Korea, May 21-25, 2018; consisting of 4 pages.
3GPP TSG RAN WG2 #106 Tdoc R2-1906249; Title: WUS grouping design overview and UE distribution; Source: Qualcomm Incorporated; Agenda Item: 12.2.3; Document for: Discussion and decision; Agenda Item: 12.2.3; Date and Location: Reno, USA, May 13-17, 2019; consisting of 6 pages.
3GPP TSG-RAN2 meeting#105bis R2-1903492 Revision of R2-1901488; Title: Remaining issues of UE grouping for WUS; Source: ZTE Corporation, Sanechips; Agenda item: 12.2.3; Document for: Discussion and Decision; Date and Location: Xi'an, China, Apr. 8-12, 2019, consisting of 8 pages.

* cited by examiner

WUS SIGNAL DESIGN

CROSS-REFERENCE TO RELATED APPLICATIONS

This application is a Submission Under 35 U.S.C. § 371 for U.S. National Stage Patent Application of International Application No.: PCT/EP2020/063347, filed May 13, 2020 entitled "WUS SIGNAL DESIGN," which claims priority to U.S. Provisional Application No. 62/847,636, filed May 14, 2019, entitled "WUS SIGNAL DESIGN," the entireties of both of which are incorporated herein by reference.

TECHNICAL FIELD

The present disclosure generally relates to a network node, a wireless communication device, methods for them, and computer programs for implementing the methods. In particular, the present disclosure relates to transmitting a signal from a network node to a wireless communication device, and receiving a signal by a wireless communication device from a network node. The disclosure further relates to determining signal configurations and communicating the signal configurations for efficient transmission of the signal.

BACKGROUND

There are technologies to cover Machine-to-Machine (M2M) and/or Internet of Things (IoT) related use cases. There are approaches to support Machine-Type Communications (MTC) with new User Equipment (UE) categories, Cat-M1, Cat-M2, supporting reduced bandwidth of six physical resource blocks (PRBs), or up to 24 PRBs for Cat-M2, and Narrowband IoT (NB-IoT) UEs providing a new radio interface and corresponding UE categories, Cat-NB1 and Cat-NB2.

It will be referred to $3^{rd}$ Generation Partnership Project (3GPP) Long Term Evolution (LTE) enhancements introduced in 3GPP Release 13, 14 and 15 for MTC as "LTE-MTC", also known as "LTE-M" and "eMTC", including but not limiting to support for bandwidth limited UEs, Cat-M1, and support for coverage enhancements. This is to separate the discussion from NB-IoT, which notation here is used for any Release, although the supported features are similar on a general level.

There are multiple differences between "legacy" LTE and the procedures and channels defined for LTE-MTC and for NB-IoT. Some important differences include a new physical channel, such as the physical downlink control channels, called MPDCCH in LTE-MTC and NPDCCH in NB-IoT, and a new physical random access channel, NPRACH, for NB-IoT. Another difference is the coverage level, also known as coverage enhancement level, that these technologies can support. By applying repetitions to the transmitted signals and channels, both LTE-MTC and NB-IoT allow UE operation down to much lower signal-to-noise ratio (SNR) level compared with LTE, i.e. Es/Iot≥−15 dB being the lowest operating point for LTE-MTC and NB-IoT which can be compared with −6 dB Es/IoT for "legacy" LTE. Here, Es is a measure of the useful received energy per resource element, and Iot is a measure of the received power spectral density of the total noise and interference per resource element.

There are approaches for reduction of energy consumption, e.g. a 'Wake-up signal' (WUS) which is based on the transmission of a short signal that indicates to the UE that it should continue to decode a downlink (DL) control channel e.g. full NPDCCH for NB-IoT or MPDCCH for LTE-MTC. If such signal is absent, e.g. in discontinuous transmission (DTX) where the UE cannot detect it, the UE can go back to sleep without decoding the DL control channel. The decoding time for a WUS is considerably shorter than that of the full NPDCCH/MPDCCH since the WUS essentially only needs to contain one bit of information whereas the NPDCCH/MPDCCH may contain up to around 35 bits of information. This, in turn, reduces UE power consumption and leads to longer UE battery life. The WUS would be transmitted only when there is paging for the UE. But if there is no paging for the UE then the WUS will not be transmitted, i.e., implying a DTX, and the UE would go back to sleep e.g. upon detecting DTX instead of WUS. This is illustrated in FIG. 1, where white blocks indicate possible WUS and Paging Occasion (PO) positions whereas the black boxes indicate actual WUS and PO positions.

The specification of Rel-15 WUS is spread out over several parts of the LTE 36-series standard, e.g., 36.211, 36.213, 36.304 and 36.331. The sequence is e.g., defined in 36.211 as follows for LTE-MTC:

The MTC WUS (MWUS) sequence w(m) in subframe x=0, 1, . . . , M−1 is defined by $$w(m) = \theta_{n_f, n_s}(m') e^{j\frac{\pi u n(n+1)}{131}}$$

$$m = 0, 1, \ldots, 131$$

$$m' = m + 132x$$

$$n = m \bmod 132$$

$$\theta_{n_f, n_s}(m') = \begin{cases} 1 & \text{if } c_{n_f, n_s}(2m') = 0 \text{ and } c_{n_f, n_s}(2m'+1) = 0 \\ -1 & \text{if } c_{n_f, n_s}(2m') = 0 \text{ and } c_{n_f, n_s}(2m'+1) = 1 \\ j & \text{if } c_{n_f, n_s}(2m') = 1 \text{ and } c_{n_f, n_s}(2m'+1) = 0 \\ -j & \text{if } c_{n_f, n_s}(2m') = 1 \text{ and } c_{n_f, n_s}(2m'+1) = 1 \end{cases}$$

$$u = (N_{ID}^{cell} \bmod 126) + 3$$

where M is the actual duration of MWUS.

The scrambling sequence $c_{n_f, n_s}(i)$, i=0, 1, . . . , 2·132M−1 is given by clause 7.2, and shall be initialized at the start of the MWUS with $$c_{init\_WUS} = (N_{ID}^{cell} + 1)\left(\left(10 n_{f\_start\_PO} + \left\lfloor \frac{n_{s\_start\_PO}}{2} \right\rfloor\right) \bmod 2048 + 1\right)2^9 + N_{ID}^{cell}$$

where $n_{f\_start\_PO}$ is the first frame of the first PO to which the MWUS is associated, and $n_{s\_start\_PO}$ is the first slot of the first PO to which the MWUS is associated.

The MWUS bandwidth is two consecutive PRBs, the frequency location of the lowermost PRB signalled by higher layers. For both PRB pairs in the frequency domain, for which MWUS is defined, the MWUS sequence w(m) shall be mapped to resource elements (k,l) in sequence, starting with w(0) in increasing order of first the index k=0, 1, . . . , $N_{sc}^{RB}$−1, over the 12 assigned subcarriers and then the index l=3, 4, . . . , $2N_{symb}^{DL}$−1 in each subframe in which MWUS is transmitted.

As from the equations above, the WUS sequence is only dependent on the time instant of the PO to which it is associated and the eNodeB (eNB) cell id. That implies that it is not possible to further distinguish which UE(s) that is(are) paged among the UEs belonging to the same PO. In most cases only a single UE is paged at a time, in which case the remaining UEs will unnecessarily monitor the subsequent MPDCCH.

The same sequence is used for NB-IoT, however, in that case, only one PRB is used, i.e., the signal is not repeated.

In coming Release(s), the WUS is further developed to also include UE grouping, such that the number of UEs that are sensitive to the WUS is further narrowed down to a smaller subset of the UEs that are associated with a specific PO. The legacy WUS was designed such that all UEs belongs to the same group. That is, a transmitted WUS associated to a specific PO may wake-up all UEs that are configured to detect paging at that PO. Hence, all UEs which are not targeted by the page, will wake up unnecessarily.

Furthermore, the legacy WUS only occupies a single resource per PO, where a (WUS) resource refers to a specific location of the WUS in time and frequency. Contrary to this, the upcoming WUS which includes UE grouping will be configurable to occupy multiple resources. This will lead to less false wake-ups for UEs and hence more power savings. With respect to this the following agreements were made in 3GPP Radio Access Network Working Group 1 (RAN WG1) before the RAN1 #97 meeting:

LTE-MTC
Agreement
Down-select one of the following options until RAN1 #97 based on evaluation results including power saving gain, usage of resources, etc.
  Up to 2 orthogonal WUS resources may be configured in time domain
  Up to 2 orthogonal WUS resources may be configured in frequency domain
  Up to 2 orthogonal WUS resources may be configured per dimension (up to 4 orthogonal WUS resources in total)
  Up to 2 orthogonal WUS resources may be configured either in time or frequency domain (only one of the two can be configured)
  Determine in RAN1 #97 whether legacy WUS resource is counted as one of the configured WUS resource(s).
NB-IoT
Agreement
  Up to 2 time-multiplexed WUS resources, for both legacy WUS and group WUS, may be configured. FFS whether a group WUS resource may be shared with legacy WUS or not.
Agreement
  Group WUS location in relation to legacy WUS may be configured such that:
  If one group WUS resource is configured, that group WUS resource may be configured to coincide with the legacy WUS resource or to occur immediately before the legacy WUS resource, and,
  If two group WUS resources are configured, the first group WUS resource coincides with the legacy WUS resource and the second group WUS resource occurs immediately before the first group WUS resource.

It is to be noted that the notation "FFS" in this context means For Further Study, i.e. the topic is intended for later proceedings in the standardisation process.

In addition to the above, it has been shown that many groups are important to achieve low false wake-up rates and hence achieve good UE energy efficiency.

The existing Rel-15 WUS implementation only uses one resource for transmitting WUS. Hence it is not affected by the problem presented in this disclosure, but the single resource results in unnecessarily high false wake-up rates from UEs erroneously detecting WUS without being paged themselves. This is mitigated in Rel-16 where WUS may be allocated to multiple resources, i.e., multiplexed in either time, or frequency, or both.

For Rel-16, the previous alternatives are either to use a set of UE group codes that provides unique codes for all UE groups, regardless of which resource the UE group belongs to, or to use the same set of UE group codes or UE group sequences for all resources, i.e., recycle the codes over different resources. Typically, more codes or sequences allow for more UE groups, which in turn allows for better UE power properties. However, code or sequence designs allowing for many codes typically does not provide as good cross-correlation properties as code designs allowing for fewer codes.

Furthermore, transmitting the same signal in multiple frequency locations simultaneously result in increased peak-to-average power ratio (PAPR) of the transmitted signal, and thereby non-linear interference may result from compression in the analog transmitter path. Another problem may be timing ambiguity, i.e., a device with a timing error due to prolonged sleep may erroneously detect its sequence in the wrong timing location. Hence there is a need for an approach to UE grouping that both allows for good cross-correlation properties among groups sharing a resource and differentiation among groups in different resources such that PAPR and timing ambiguity may be avoided.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' understanding that a proper way of providing a signal for low-complexity reception, i.e. low-energy consumption, is needed although complexity of the context is increased. The inventors have also realised that signal configurations for such transmissions may need to be made more flexible, to which a solution is given by providing information about the signal configuration.

According to a first aspect, there is provided a method of a network node arranged for wireless communication with wireless communication devices. The method is for transmission of a signal to the wireless communication devices and comprises receiving, from another network node, a paging message intended for a wireless device belonging to a first group of wireless devices, determining, from the received paging message, a signal resource allocation and the group of the wireless device, determining a signal sequence based on the signal resource allocation and the group of the wireless device, and transmitting the signal comprising the determined signal sequence using the determined signal resource allocation.

The signal sequence may comprise an elementwise multiplication of a resource sequence with a group sequence. The resource sequence may be a Zadoff-Chu sequence which is elementwise multiplied with a scrambling sequence, wherein the initialisation of the scrambling sequence is determined based on the allocated resource. The group sequence may be an elementwise phase shift based on the group.

The received paging message comprises any of device identity, service information, and paging rate.

The transmitted signal may comprise a wake-up signal.

According to a second aspect, there is provided a method of a network node arranged for wireless communication with wireless communication devices. The method is for provision of signal configurations to the wireless communication devices and comprises determining a first resource allocation and a second resource allocation to use for the signal configurations, wherein the first resource allocation is different and adjacent in time and/or frequency from the second resource allocation, determining a first group and a second group of wireless communication devices, wherein the first resource allocation is allocated to the first group of wireless devices and the second resource allocation is allocated to the second group of wireless devices, and wirelessly transmitting information about the signal configurations as a system information message to the first and second groups of wireless devices.

The wirelessly transmitting of the system information message may comprise transmitting a broadcast message, or transmitting a dedicated radio resource control message.

The first and second resource allocation may comprise two resource allocations on same frequency and adjacent in time, two resource allocations on same time and adjacent in frequency, or two resource allocations adjacent in time and frequency.

The determining of the first and second resource allocations may comprise receiving information about the allocations from another network node.

The determining of the first and second resource allocations may comprise retrieving the information about the allocations from a memory storage.

The method may comprise determining a number of groups to use, wherein the wireless transmission of the information about the signal configurations includes information about number of groups. The determining of the number of groups to use may comprise receiving information about the number of groups to use from another network node. Alternatively, the determining of the number of groups to use may comprise retrieving the information about the number of groups to use from a memory storage. The information about number of groups may represent any of a number of groups per resource allocation, and a number of groups for all resource allocations.

The signal configuration may comprise a resource sequence for respective resource allocation, and the wirelessly transmitting information about the signal configurations as a system information message to the first and second groups of wireless devices also comprises indications on the used resource sequences.

The signal configuration may comprise a resource sequence which is a Zadoff-Chu sequence which is elementwise multiplied with a scrambling sequence, where the initialisation of the scrambling sequence is determined based on the first and second resource allocations, respectively.

The signal configuration may be a signal configuration for a wake-up signal.

The transmission of the signal to the wireless communication devices of the method of the first aspect may use a signal configuration communicated according to the method of the second aspect, According to a third aspect, there is provided a computer program comprising instructions which, when executed on a processor of a network node, causes the network node to perform the method according to any one of the first or second aspects.

According to a fourth aspect, there is provided a method of a wireless device. The method is for reception of a signal from a network node and comprises wirelessly receiving information about a signal configuration in a system information message, determining a resource allocation and a group to which the wireless device belongs based on the information about the signal configuration, determining a signal sequence to be attentive to based on the resource allocation and the group, wirelessly receiving available signals, and detecting the signal among received signals by identifying the signal sequence at the determined resource allocation.

The sequence to be attentive to may comprise an elementwise multiplication of a resource sequence with a group sequence. The group sequence may be an elementwise phase shift based on the group. The resource sequence may be a Zadoff-Chu sequence which is elementwise multiplied with a scrambling sequence, wherein the initialisation of the scrambling sequence is determined based on the resource allocation.

The received signal may comprise a wake-up signal.

The information about the signal configurations may include information about a number of used groups. The information about a number of used groups may represent any of a number of groups per resource allocation, and a number of groups for all resource allocations.

The wirelessly receiving of the information about a signal configuration in a system information message may comprise receiving a broadcast message, or receiving a dedicated radio resource control message.

The information about the signal configuration may comprise a resource sequence for respective resource allocation, and the wirelessly receiving information about the signal configurations in a system information message may comprise receiving indications on the used resource sequence.

According to a fifth aspect, there is provided a computer program comprising instructions which, when executed on a processor of a wireless communication device, causes the wireless communication device to perform the method according to the fourth aspect.

According to a sixth aspect, there is provided a network node arranged for wireless communication with wireless communication devices comprising circuitry arranged to perform the method of any of the first and second aspects.

According to a seventh aspect, there is provided a wireless communication device comprising circuitry arranged to perform the method of the fourth aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Figure 1:
FIG. 1 schematically illustrates possible WUS and PO positions and actual WUS and PO positions.
Figure 2:
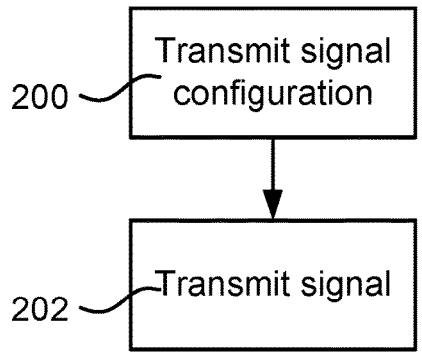
FIG. 2 is a flow chart illustrating a method for a network node according to an embodiment.
Figure 3:
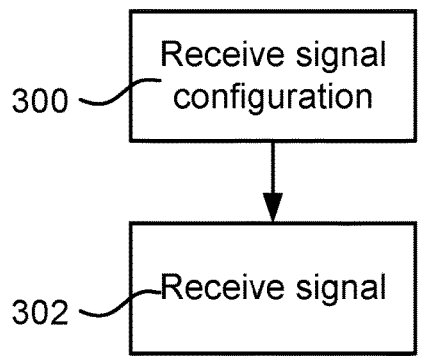
FIG. 3 is a flow chart illustrating a method for a wireless communication device according to an embodiment.

This disclosure relates to configuration of signal transmission, and to transmission of a signal. This applies both to a network node and to a wireless communication device, respectively. The signal may be a WUS, e.g. for an LTE-MTC or NB-IoT context, but the approach may be applied to other types of signals and/or contexts. FIG. 2 is a flow chart schematically illustrating operations of the network node where the network node transmits 200 a signal configuration to associated wireless devices. A wireless device may be associated with a network node by, for example, being served by or camping on a cell served by the network node. When the signal is transmitted 202 to the addressed wireless device(s), the wireless devices know the signal configuration and will be able to detect the signal. Similarly, FIG. 3 is a flow chart schematically illustrating operations of the wireless communication device. The wireless communication device receives 300 information about the signal configuration. The wireless communication device is then capable of properly receiving 302 the signal.

In a network configuration aspect, the network node transmits configuration information to devices associated with the network node for the wireless devices to be able to receive a signal according to the configuration. Hence, the disclosure provides a method in a network node for transmitting a signal configuration message to devices associated with the network node, where said signals may be transmitted in different adjacent time-frequency resources and where the resource is depending on properties of the device, such as belonging to a certain group, etc.

Figure 4:
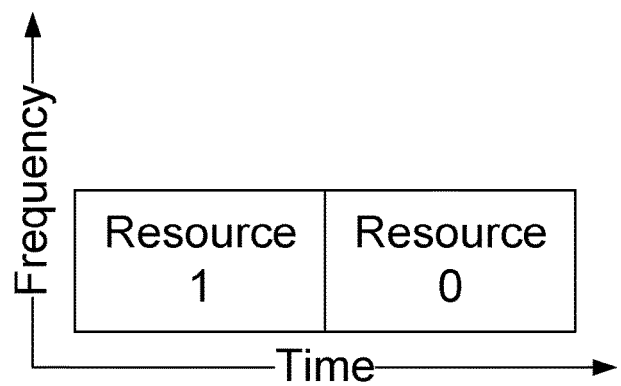
FIG. 4 illustrates an example on time-frequency resources being time multiplexed.
Figure 5:
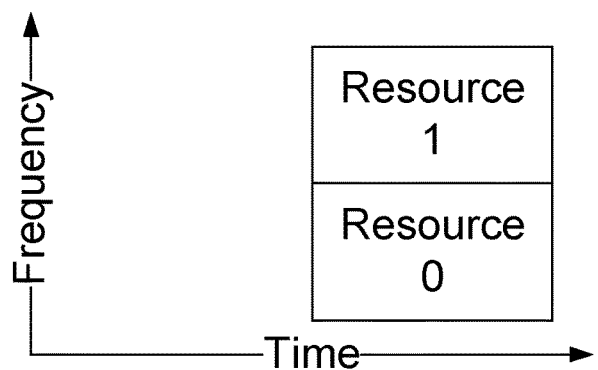
FIG. 5 illustrates an example on time-frequency resources being frequency multiplexed.
Figure 6:
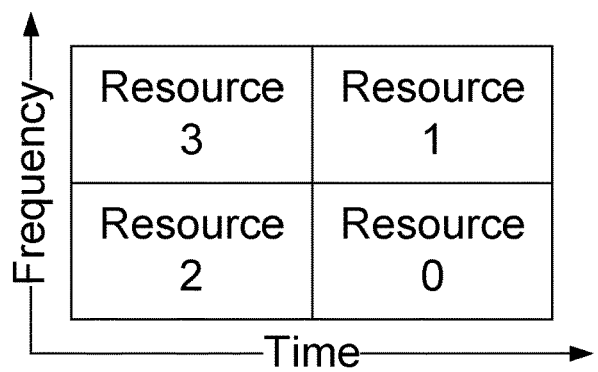
FIG. 6 illustrates an example on time-frequency resources being multiplexed in both time and frequency.

The time-frequency resources may be time multiplexed, as illustrated in FIG. 4, or be frequency multiplexed, as illustrated in FIG. 5, or be multiplexed in both time and frequency, as illustrated in FIG. 6.

Here, the term "adjacent" should be construed in its context of that the receiver to receive the signal is desired to operate in a narrow band, e.g. 1.4 MHz or narrower, compared with a band in which a cellular receiver usually operates, e.g. 20 MHz or wider, and that the receiver to receive the signal should be on only for a short time, both to save energy. Thus, "adjacent" should thus be construed as within such limitations but not necessarily consecutive time and/or frequency PRBs.

Figure 7:
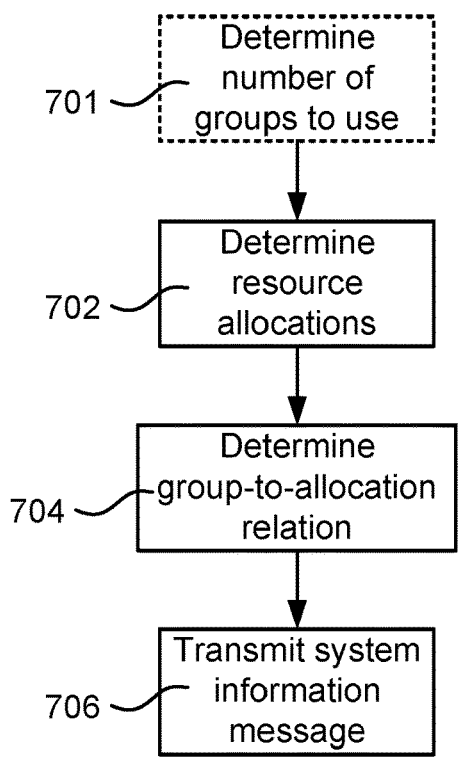
FIG. 7 is a flow chart illustrating a method for a network node according to an embodiment.

FIG. 7 is a flow chart which schematically illustrates transmission of signal configuration, Cf FIG. 2, block 200, to be performed by a network node. The signal configurations comprise different resource allocations. The network node determines 702 resource allocations based on a determined set of resources to be used for transmitting a signal, e.g. a WUS. The resource allocations can be for two or more wireless devices or groups of wireless devices, with e.g. the aim of unnecessarily waking up wireless devices. The resource allocations can for example be any of those demonstrated with reference to FIGS. 4 to 6. In one case, the network node determines the signal configuration by reading a file from a memory storage whereas in another case, the network node determines the configuration by receiving configuration information through signalling from a network node, e.g. from a core network node.

For the case where more than two groups of wireless devices are feasible, e.g. as by the possible resource allocations shown in FIG. 6, the network node may determine 701 a number of groups to address by the resource allocations. Here, it should be noted that a plurality of groups may share one resource, but for the benefits of the approach provided in this disclosure, the case where at least some different groups are allocated to different resources is mainly considered. An indication on number of groups can represent a number of groups per resource allocation or a number of groups for all resource allocations. Based on the collected information, a group-to-allocation relation is determined 704. That is, the groups have an association to a signal configuration through their resource allocations. Information about the group-to-allocation relation is transmitted 706 from the network node through a system information (SI) message, such as a broadcasted message or a dedicated radio resource control (RRC) message.

The signal configuration may comprise a resource sequence for respective resource allocation. The information about the signal configurations may comprise indications on the used resource sequences. For example, the first resource allocation is associated with a first resource sequence and the second resource allocation is associated with a second resource sequence, where the second resource sequence is a phase shifted version of the first resource sequence. That is, each symbol is assigned with a phase shift, e.g. $+/-\pi/2$, $\pi$, etc. The phase shifts may be on a symbol level or for larger parts of the sequence of symbols, or for the whole sequence. For example, the phase shifted version of the first resource sequence may comprise an inverted version of the first resource sequence, i.e. each symbol of the second resource sequence is phase shifted with 7E in relation to the first resource sequence. Another example is that the second resource sequence is an element shifted version of the first resource sequence. That is, each element in the second resource sequence is cyclically shifted one or more steps in relation to the first resource sequence. Information about the signal configurations may in such cases indicate the shifts.

A further example is that the resource sequence is a Zadoff-Chu sequence which is elementwise multiplied with a scrambling code, where the first resource allocation is associated with a first resource sequence having a first index of the Zadoff-Chu sequence and the second resource allocation is associated with a second resource sequence having a second index of the Zadoff-Chu sequence. The indices may be included in the indications on the used resource sequences. In another example, the resource sequence is a Zadoff-Chu sequence which is elementwise multiplied with a scrambling sequence, where the initialisation of the scrambling sequence is determined based on the first and second resource allocation, respectively.

Still a further example is that the second resource sequence comprises an element-to-resource element mapping permutation of the first resource sequence. For example, the mapping permutation may comprise that symbols are cyclically shifted or reordered, e.g. opposite order, in frequency and/or time.

The mutual rearranging of the sequences may provide for limitation of PAPR when the resource allocations are frequency-wise.

Figure 8:
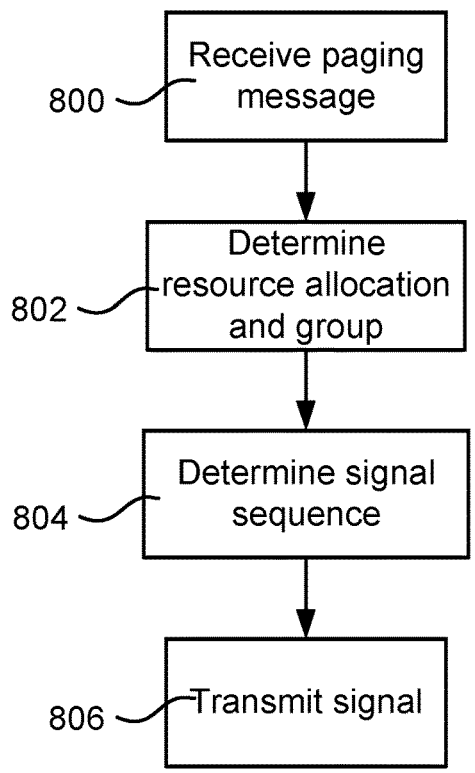
FIG. 8 is a flow chart illustrating a method for a network node according to an embodiment.

FIG. 8 is a flow chart which schematically illustrates transmission of a signal, Cf FIG. 2, block 202, to be performed by a network node to a wireless device. The signal can for example be a WUS. The transmission is to be performed according to a signal configuration associated with the resource allocation for the respective group.

The network node receives 800 a paging message from another network node, e.g. a core network node, which paging is intended for a wireless device belonging to a first group of wireless devices. It is determined 802, based on the received paging message, a signal resource allocation and the group of the wireless device. The resource allocation can be retrieved from a network node or be determined from a memory storage. The network node can thus determine 804 a signal sequence based on the signal resource allocation and the group of the wireless device. The addressed wireless device(s) is(are) assumed to be watching for the signal, and with the properties of the signal, in the allocated resource by a previous signalling of the signal configuration as demonstrated with reference to FIG. 7. The network node then transmits 806 the signal comprising the determined signal sequence using the determined signal resource allocation. For the case of the signal being a WUS, the wireless device starts monitoring a paging channel upon proper reception of the signal wherein the wireless device can receive the paging message, which is transmitted on its PO.

The received paging message may for example comprise device identity, service information, paging rate, subscriber identity module (SIM) information, categorisations such as whether being UL or DL heavy, etc.

The determination 804 of the signal sequence may comprise an elementwise multiplication of a resource sequence, which may be according to any of the examples demonstrated above, with a group sequence. The group sequence is may be an elementwise rearranging based on the group, e.g. a phase shift. The group sequence may be a Gold scrambling code based on the group. The group sequence may alternatively be a time-frequency short orthogonal code based on the group.

Alternatively, the signal sequence may be determined 804 to be the resource sequence, possibly scrambled with a scrambling code such as a Gold scrambling code.

The signal is then transmitted 806.

According to one example, the signal to transmit 806 is a resource sequence elementwise multiplied with a UE group sequence. In one case, the resource sequence is a Zadoff-Chu sequence elementwise multiplied with a scrambling sequence. In this case, the Zadoff-Chu sequence may be related to the cell identity (ID) or parts of the cell ID, for example in the same or similar way as in the definition of the MWUS as described in 3GPP specification 36.211, Sec. 6.11B, and also included above, where the cell ID is used to determine the sequence index u. Similarly, the scrambling sequence may be related to a related timing information, e.g., timing location for a subsequent PO, in the same or similar way as in the definition of the MWUS, where $n_{f\_start\_PO}$ and $n_{s\_start\_PO}$ are used in the expression for the variable $c_{init\_WUS}$ which parameterizes the initialisation of the scrambling sequence. As explained in the referenced clause 7.2 of 36.211, the initialisation variable of a pseudo-random sequence in 3GPP, such as the scrambling sequence, can generally be represented by an integer $c_{init}$ which is related to an initialisation bit string $x_2$ via the expression $c_{init} = \Sigma_{i=0}^{30} x_2(i) \cdot 2^i$, where the bit string $x_2$ describes the initial state for the scrambling sequence generation. Therefore, at least some of the bits in the initialisation bit string $x_2$ may be related to the timing location, e.g. as in the existing MWUS definition using different values of $n_{f\_start\_PO}$ and $n_{s\_start\_PO}$. In one case, the initialisation of the scrambling sequence may further be related to the resource in which the signal will be transmitted such that one or more bits are determined by the signal resource. Furthermore, in one case, the UE group sequence is an elementwise phase shift of the resource sequence as described in 3GPP contribution R1-1905956. In another case, the UE group sequence is a Gold scrambling code, the initialisation of which is determined by the UE group as described in 3GPP contribution R1-1907569, Sec. 4. In yet another case, the UE group sequence is a time-frequency short orthogonal cover code determined by the UE group as described in 3GPP contribution R1-1906772, Sec. 3.

Figure 9:
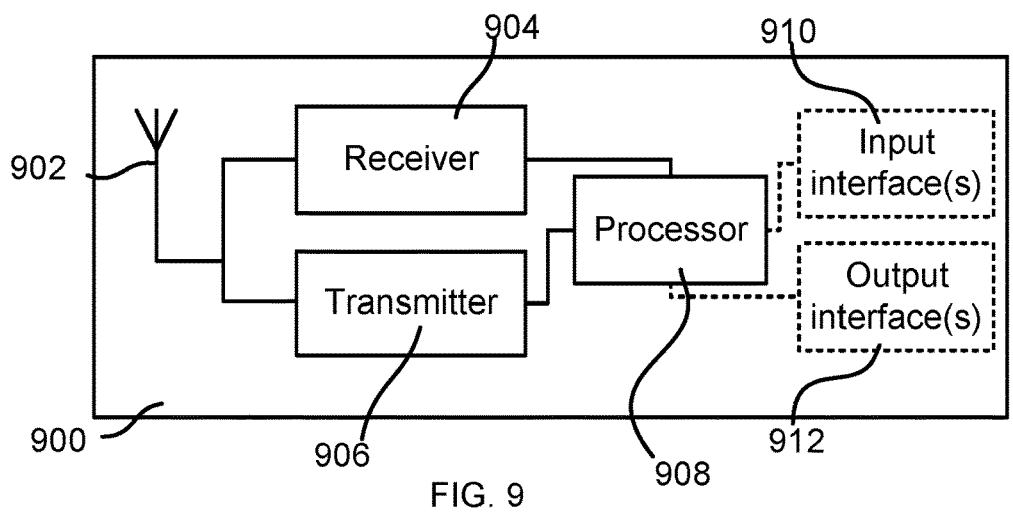
FIG. 9 is a block diagram schematically illustrating a network node according to an embodiment.

FIG. 9 is a block diagram schematically illustrating a network node 900 according to an embodiment. The network node 900 comprises an antenna arrangement 902, a receiver 904 connected to the antenna arrangement 902, a transmitter 906 connected to the antenna arrangement 902, a processing element 908 which may comprise one or more circuits, one or more input interfaces 910 and one or more output interfaces 912. The interfaces 910, 912 can be operator interfaces and/or signal interfaces, e.g. electrical or optical. The network node 900 is arranged to operate in a cellular communication network. In particular, by the processing element 908 being arranged to perform the embodiments demonstrated with reference to FIGS. 1 to 8, the network node 900 is capable of providing a signal configuration and/or providing a signal, e.g. a WUS. The processing element 908 can also fulfil a multitude of tasks, ranging from signal processing to enable reception and transmission since it is connected to the receiver 904 and transmitter 906, executing applications, controlling the interfaces 910, 912, etc.

Figure 10:
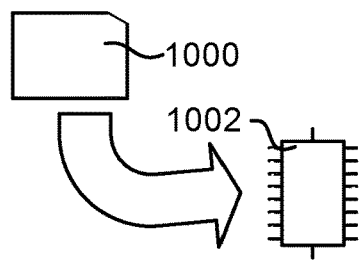
FIG. 10 schematically illustrates a computer-readable medium and a processing device.

The methods according to the present disclosure is suitable for implementation with aid of processing means, such as computers and/or processors, especially for the case where the processing element 908 demonstrated above comprises a processor handling the provision of signal configuration and/or the signal as demonstrated above. Therefore, there is provided computer programs, comprising instructions arranged to cause the processing means, processor, or computer to perform the steps of any of the methods according to any of the embodiments described with reference to FIGS. 1 to 8. The computer programs preferably comprise program code which is stored on a computer readable medium 1000, as illustrated in FIG. 10, which can be loaded and executed by a processing means, processor, or computer 1002 to cause it to perform the methods, respectively, according to embodiments of the present disclosure, preferably as any of the embodiments described with reference to FIGS. 1 to 8. The computer 1002 and computer program product 1000 can be arranged to execute the program code sequentially where actions of the any of the methods are performed stepwise, or execute the actions on a real-time basis where appropriate. The processing means, processor, or computer 1002 is preferably what normally is referred to as an embedded system. Thus, the depicted computer readable medium 1000 and computer 1002 in FIG. 10 should be construed to be for illustrative purposes only to provide understanding of the principle, and not to be construed as any direct illustration of the elements.

Figure 11:
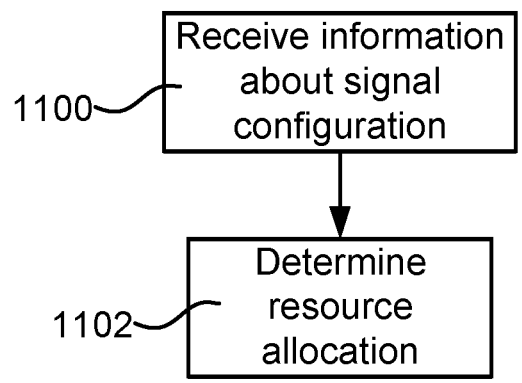
FIG. 11 is a flow chart illustrating a method for a wireless communication device according to an embodiment.

FIG. 11 is a flow chart illustrating a method of retrieving information about a signal to be detected by a wireless communication device. The wireless communication device receives 1100 information about a signal configuration for the signal to be detected. The signal configuration is received 1100 in a system information message which is transmitted to a plurality of groups of wireless devices mutually having different resource allocations. The wireless communication device determines a first resource allocation for the wireless communication device from the received signal configuration. The system information message may be in a broadcast message, or in a dedicated RRC message.

The first resource allocation and a second resource allocation targeting other wireless devices may be two resource allocations adjacent in time or two resource allocations adjacent in frequency. The resource allocations may be made in both time and frequency simultaneously. Thus, more than two resource allocations may be present, as demonstrated with reference to FIG. 6.

The wireless communication device can belong to a first group, and the wireless transmission of the information about the signal configurations can include information about a number of used groups. The information about the number of groups may be represented by a number of groups per resource allocation or a number of groups for all resource allocations.

The signal configuration may comprise a resource sequence for respective resource allocation, and the information about the signal configurations may be received in a system information message comprising indications on the used resource sequence. As discussed above, the resource sequence can be a Zadoff-Chu sequence which is elementwise multiplied with a scrambling code or scrambling sequence, where index is included in the indication on the used resource sequence. For example, the initialisation of the scrambling sequence may further be based on the resource in which the signal will be transmitted such that one or more bits are determined by the signal resource.

Other examples as of above are also that the indication on the used resource sequence comprises information about any of a phase shift of the resource sequence, an element shift of the resource sequence, and an element-to-resource element mapping permutation of the resource sequence.

Figure 12:
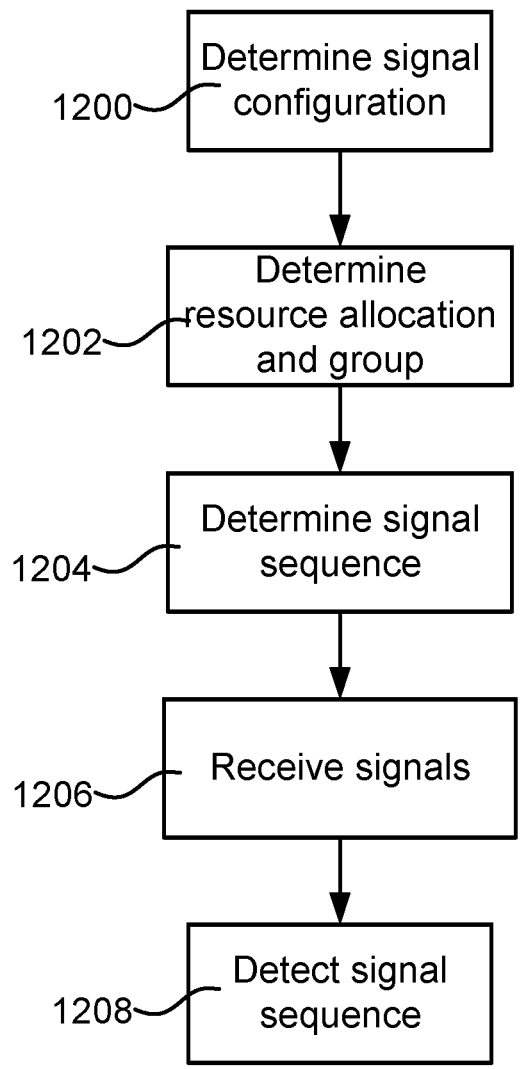
FIG. 12 is a flow chart illustrating a method for a wireless communication device according to an embodiment.

FIG. 12 is a flow chart schematically illustrating a method of detecting a received signal by the wireless communication device. The wireless communication device determines 1200 a signal configuration. The signal configuration may be inherently known, or may be retrieved as demonstrated with reference to FIG. 11. A resource allocation for the signal is determined 1202. A group to which the wireless communication device belongs may also be determined. A signal sequence to be attentive to is determined 1204 based on determining a signal sequence based on the resource allocation and the group. When the wireless communication device receives 1206 any available signals, the signal is detected 1208 among the received signals by identifying the signal sequence at the determined resource allocation. Since the resource allocation is known, and the signal sequence is formed for easy detection, e.g. through correlation, the wireless communication device will be able to perform the detection 1208 in an energy efficient way.

The signal configuration thus provides for the wireless communication device to perform the energy efficient detection by the knowledge about which resource to look in and what sequence to look for. The determining 1204 of the sequence to be attentive to may comprise forming the sequence based on a resource sequence and a group sequence, e.g. by elementwise multiplying the resource sequence with the group sequence. As discussed above, the resource sequence may be a Zadoff-Chu sequence which is elementwise multiplied with a scrambling code, such as a Gold scrambling code, or other scrambling sequence wherein an index of the Zadoff-Chu sequence is based on the allocated resource and/or indicated in a received signal configuration. Initialisation of the scrambling sequence may further be related to the resource in which the signal will be transmitted such that one or more bits are determined by the signal resource. The one or more bits may be determined by the signal resource. The initialisation may refer to the initialisation string represented by the $c_{init}$ as referred to above. As also discussed above, the signal configuration can comprise information about a resource sequence for respective resource allocation, and a differentiation between resource sequences for different wireless communication devices or groups of wireless communication devices can comprise any of a phase shift of the resource sequence, an element shift of the resource sequence, and an element-to-resource element mapping permutation of the resource sequence.

The group sequence can for example be an elementwise phase shift based on the group, a Gold scrambling code based on the group, or a time-frequency short orthogonal code based on the group.

The received signal can comprise a wake-up signal causing the wireless communication device to listen for a paging message at a next PO, but the approach can also be used for other purposes where only very little information is needed in DL. To mention one example, the purpose can be to trigger an IoT device to provide a measurement value or take a predetermined action, e.g. closing/opening a valve or switch.

Figure 13:
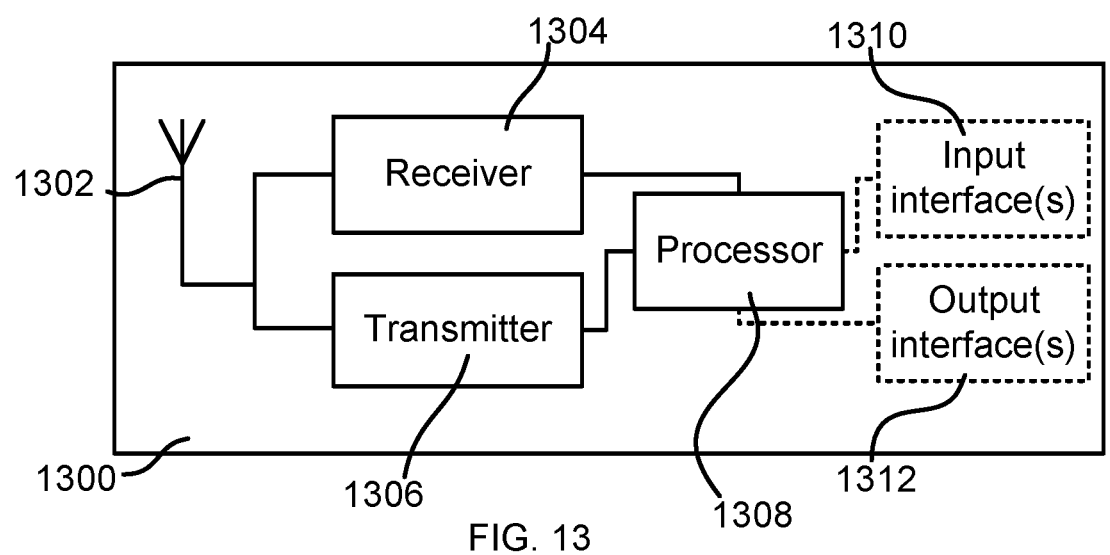
FIG. 13 is a block diagram schematically illustrating a wireless communication device according to an embodiment.

FIG. 13 is a block diagram schematically illustrating a wireless communication device such as a UE 1300 according to an embodiment. The UE comprises an antenna arrangement 1302, a receiver 1304 connected to the antenna arrangement 1302, a transmitter 1306 connected to the antenna arrangement 1302, a processing element 1308 which may comprise one or more circuits, one or more input interfaces 1310 and one or more output interfaces 1312. The interfaces 1310, 1312 can be user interfaces and/or signal interfaces, e.g. electrical or optical. The UE 1300 is arranged to operate in a cellular communication network. In particular, by the processing element 1308 being arranged to perform the embodiments demonstrated with reference to FIGS. 1 to 6, the UE 1300 is capable of receiving a signal configuration and/or detecting a signal, e.g. a WUS. The processing element 1308 can also fulfil a multitude of tasks, ranging from signal processing to enable reception and transmission since it is connected to the receiver 1304 and transmitter 1306, executing applications, controlling the interfaces 1310, 1312, etc.

Figure 14:
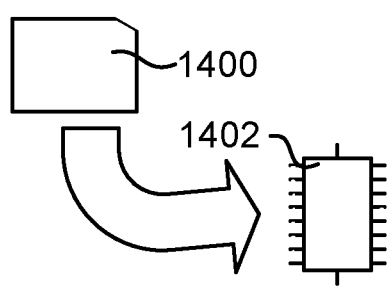
FIG. 14 schematically illustrates a computer-readable medium and a processing device.

The methods according to the present disclosure is suitable for implementation with aid of processing means, such as computers and/or processors, especially for the case where the processing element 1308 demonstrated above comprises a processor handling a signal configuration and/or detecting a signal, e.g. a WUS. Therefore, there is provided computer programs, comprising instructions arranged to cause the processing means, processor, or computer to perform the steps of any of the methods according to any of the embodiments described with reference to FIG. 1 to 6. The computer programs preferably comprise program code which is stored on a computer readable medium 1400, as illustrated in FIG. 14, which can be loaded and executed by a processing means, processor, or computer 1402 to cause it to perform the methods, respectively, according to embodiments of the present disclosure, preferably as any of the embodiments described with reference to FIGS. 1 to 6. The computer 1402 and computer program product 1400 can be arranged to execute the program code sequentially where actions of the any of the methods are performed stepwise. The processing means, processor, or computer 1402 is preferably what normally is referred to as an embedded system. Thus, the depicted computer readable medium 1400 and computer 1402 in FIG. 14 should be construed to be for illustrative purposes only to provide understanding of the principle, and not to be construed as any direct illustration of the elements.

Figure 15:
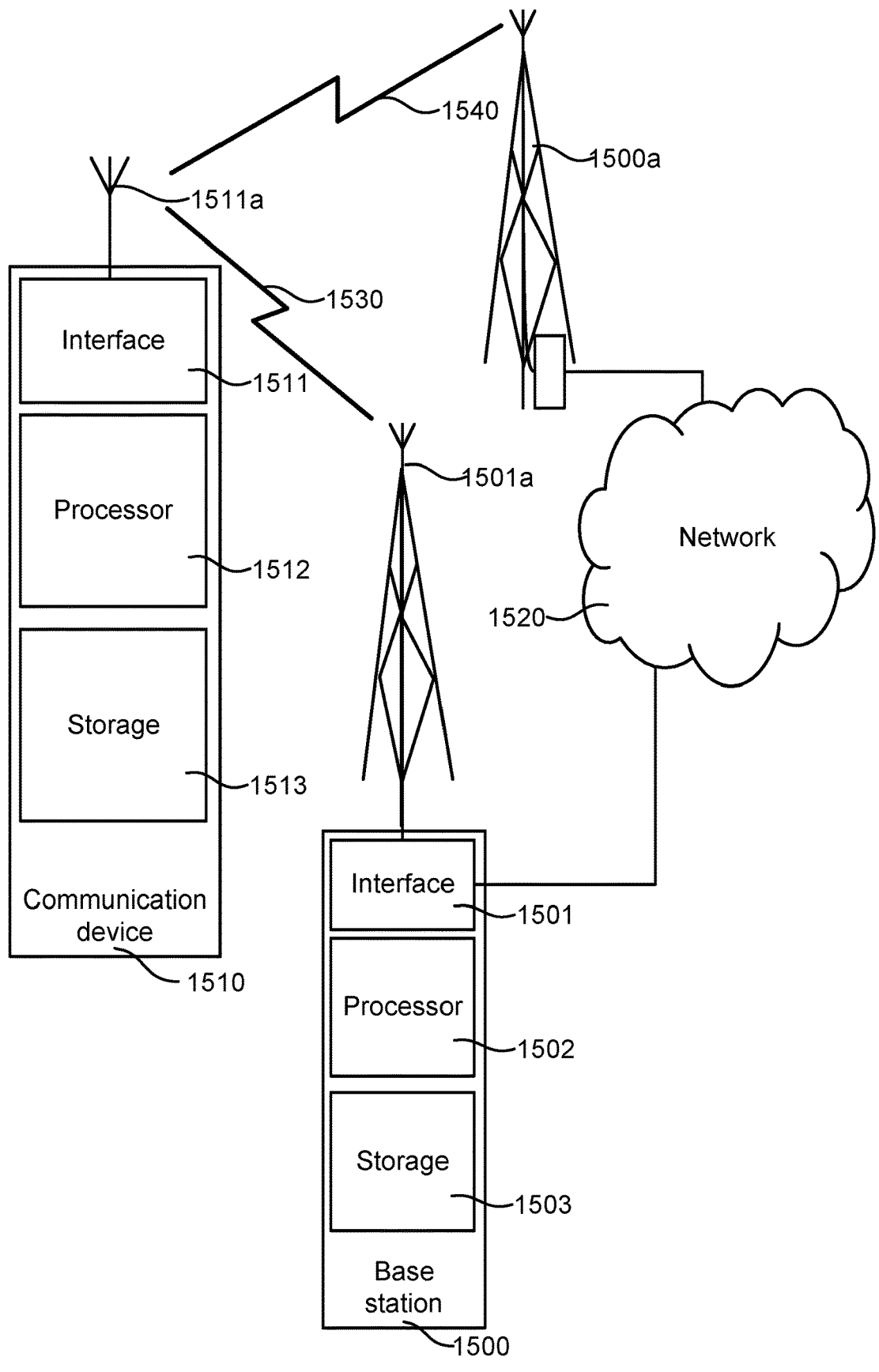
FIG. 15 illustrates a wireless network including network nodes and a wireless communication device.

FIG. 15 illustrates a wireless network comprising network (NW) nodes 1500 and 1500a and a wireless device 1510 with a more detailed view of the network node 1500 and the communication device 1510 in accordance with an embodiment. For simplicity, FIG. 15 only depicts core network 1520, network nodes 1500 and 1500a, and communication device 1510. Network node 1500 comprises a processor 1502, storage 1503, interface 1501, and antenna 1501a. Similarly, the communication device 1510 comprises a processor 1512, storage 1513, interface 1511 and antenna 1511a. These components may work together in order to provide network node and/or wireless device functionality as demonstrated above. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 1520 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. The network 1520 may comprise a network node for performing the method demonstrated with reference to FIG. 8, and/or an interface for signalling between network nodes 1500, 1500a.

The network node 1500 comprises a processor 1502, storage 1503, interface 1501, and antenna 1501a. These components are depicted as single boxes located within a single larger box. In practice however, a network node may comprise multiple different physical components that make up a single illustrated component (e.g., interface 1501 may comprise terminals for coupling wires for a wired connection and a radio transceiver for a wireless connection). Similarly, network node 1500 may be composed of multiple physically separate components (e.g., a NodeB component and an RNC component, a BTS component and a BSC component, etc.), which may each have their own respective processor, storage, and interface components. In certain scenarios in which network node 1500 comprises multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, network node 1500 may be configured to support multiple radio access technologies (RATs). In such embodiments, some components may be duplicated (e.g., separate storage 1503 for the different RATs) and some components may be reused (e.g., the same antenna 1501a may be shared by the RATs).

The processor 1502 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1500 components, such as storage 1503, network node 1500 functionality. For example, processor 1502 may execute instructions stored in storage 1503. Such functionality may include providing various wireless features discussed herein to a wireless device, such as the wireless device 1510, including any of the features or benefits disclosed herein.

Storage 1503 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1503 may store any suitable instructions, data or information, including software and encoded logic, utilized by the network node 1500, the storage 1503 may be used to store any calculations made by the processor 1502 and/or any data received via the interface 1501.

The network node 1500 also comprises the interface 1501 which may be used in the wired or wireless communication of signalling and/or data between network node 1500, network 1520, and/or wireless device 1510. For example, the interface 1501 may perform any formatting, coding, or translating that may be needed to allow network node 1500 to send and receive data from the network 1520 over a wired connection. The interface 1501 may also include a radio transmitter and/or receiver that may be coupled to or a part of the antenna 1501a. The radio may receive digital data that is to be sent out to other network nodes or wireless devices via a wireless connection. The radio may convert the digital data into a radio signal having the appropriate channel and bandwidth parameters. The radio signal may then be transmitted via antenna 1501a to the appropriate recipient (e.g., the wireless device 1510).

The antenna 1501a may be any type of antenna capable of transmitting and receiving data and/or signals wirelessly. In some embodiments, antenna 1501a may comprise one or more omnidirectional, sector or panel antennas operable to transmit/receive radio signals between, for example, 2 GHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. The antenna 1501a may comprise one or more elements for enabling different ranks of SIMO, MISO or MIMO operation.

The wireless device 1510 may be any type of communication device, wireless device, UE, D2D device or ProSe UE, but may in general be any device, sensor, smart phone, modem, laptop, Personal Digital Assistant (PDA), tablet, mobile terminal, smart phone, laptop embedded equipped (LEE), laptop mounted equipment (LME), Universal Serial Bus (USB) dongles, machine type UE, UE capable of machine to machine (M2M) communication, etc., which is able to wirelessly send and receive data and/or signals to and from a network node, such as network node 1500 and/or other wireless devices. In particular, the wireless device 1510 is capable of communication as demonstrated above, e.g. in an MTC and/or NB-IoT context. The wireless device 1510 comprises a processor 1512, storage 1513, interface 1511, and antenna 1511a. Like the network node 1500, the components of the wireless device 1510 are depicted as single boxes located within a single larger box, however in practice a wireless device may comprises multiple different physical components that make up a single illustrated component (e.g., storage 1513 may comprise multiple discrete microchips, each microchip representing a portion of the total storage capacity).

The processor 1512 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 1510 components, such as storage 1513, wireless device 1510 functionality. Such functionality may include providing various wireless features discussed herein, including any of the features or benefits disclosed herein.

The storage 1513 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage 1513 may store any suitable data, instructions, or information, including software and encoded logic, utilized by the wireless device 1510. The storage 1513 may be used to store any calculations made by the processor 1512 and/or any data received via the interface 1511.

The interface 1511 may be used in the wireless communication of signalling and/or data between the wireless device 1510 and the network nodes 1500, 1500a. For example, the interface 1511 may perform any formatting, coding, or translating that may be needed to allow the wireless device 1510 to send and receive data to/from the network nodes 1500, 1500a over a wireless connection. The interface 1511 may also include a radio transmitter and/or receiver that may be coupled to or a part of the antenna 1511a. The radio may receive digital data that is to be sent out to e.g. the network node 1501 via a wireless connection. The radio may convert the digital data into a radio signal having the appropriate channel and bandwidth parameters. The radio signal may then be transmitted via the antenna 1511a to e.g. the network node 1500.

The antenna 1511a may be any type of antenna capable of transmitting and receiving data and/or signals wirelessly. In some embodiments, antenna 1511a may comprise one or more omnidirectional, sector or panel antennas operable to transmit/receive radio signals between 2 GHz and 66 GHz. For simplicity, antenna 1511a may be considered a part of interface 1511 to the extent that a wireless signal is being used. The antenna 1511a may comprise one or more elements for enabling different ranks of SIMO, MISO or MIMO operation.

In some embodiments, the components described above may be used to implement one or more functional modules used for enabling measurements as demonstrated above. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by the processors 1512 and/or 1502, possibly in cooperation with the storage 1513 and/or 1503. The processors 1512 and/or 1502 and the storage 1513 and/or 1503 may thus be arranged to allow the processors 1512 and/or 1502 to fetch instructions from the storage 1513 and/or 1503 and execute the fetched instructions to allow the respective functional module to perform any features or functions disclosed herein. The modules may further be configured to perform other functions or steps not explicitly described herein but which would be within the knowledge of a person skilled in the art.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

In addition to the disclosure above the following items are given for providing further explanations, alternatives and/or indications on possibly feasible combinations:

1. A method of a network node arranged for wireless communication with wireless communication devices, the method being for transmission of signal configurations to the wireless communication devices and comprising
   determining a first resource allocation and a second resource allocation to use for the signal configuration, wherein the first resource allocation is different and adjacent in time and/or frequency from the second resource allocation;
   determining a first group and a second group of wireless communication devices, wherein the first resource allocation is allocated to the first group of wireless devices and the second resource allocation is allocated to the second group of wireless devices;
   wirelessly transmitting information about the signal configurations as a system information message to the first and second groups of wireless devices with the first and second resource allocations, respectively.
2. The method of item 1, wherein the wirelessly transmitting of the system information message comprises
   transmitting a broadcast message, or
   transmitting a dedicated radio resource control message.
3. The method of item 1 or 2, wherein the first and second resource allocation comprises
   two resource allocations on same frequency and adjacent in time;
   two resource allocations on same time and adjacent in frequency; or
   two resource allocations adjacent in time and frequency.
4. The method of any one of items 1 to 3, wherein the determining of the first and second resource allocations comprises receiving information about the allocations from another network node.
5. The method of any one of items 1 to 3, wherein the determining of the first and second resource allocations comprises retrieving the information about the allocations from a memory storage.

6. The method of any one of items 1 to 5, comprising determining a number of groups to use, wherein the wireless transmission of the information about the signal configurations includes information about number of groups.

7. The method of item 6, wherein the determining of the number of groups to use comprises receiving information about the number of groups to use from another network node.

8. The method of item 6, wherein the determining of the number of groups to use comprises retrieving the information about the number of groups to use from a memory storage.

9. The method of any one of items 6 to 8, wherein the information about number of groups represents any of a number of groups per resource allocation; and a number of groups for all resource allocations.

10. The method of any one of items 1 to 9, wherein the signal configuration comprises a resource sequence for respective resource allocation, and the wirelessly transmitting information about the signal configurations as a system information message to the first and second groups of wireless devices also comprises indications on the used resource sequences.

11. The method of item 10, wherein the first resource allocation is associated with a first resource sequence and the second resource allocation is associated with a second resource sequence, where the second resource sequence is a phase shifted version of the first resource sequence.

12. The method of item 11, wherein the phase shifted version of the first resource sequence comprises an inverted version of the first resource sequence.

13. The method of item 10, wherein the first resource allocation is associated with a first resource sequence and the second resource allocation is associated with a second resource sequence, where the second resource sequence is an element shifted version of the first resource sequence.

14. The method of item 10, wherein the resource sequence is a Zadoff-Chu sequence which is elementwise multiplied with a scrambling code, the first resource allocation is associated with a first resource sequence having a first initialisation index of the Zadoff-Chu sequence and the second resource allocation is associated with a second resource sequence having a second initialisation index of the Zadoff-Chu sequence, where indices are included in the indications on the used resource sequences.

15. The method of item 10, wherein the first resource allocation is associated with a first resource sequence and the second resource allocation is associated with a second resource sequence, where the second resource sequence comprises an element-to-resource element mapping permutation of the first resource sequence.

16. A method of a network node arranged for wireless communication with wireless communication devices, the method being for transmission of a signal to the wireless communication devices and comprising receiving, from another network node, a paging message intended for a wireless device belonging to a first group of wireless devices;

determining, from the received paging message, a signal resource allocation and the group of the wireless device;

determining a signal sequence based on the signal resource allocation and the group of the wireless device; and transmitting the signal comprising the determined signal sequence using the determined signal resource allocation.

17. The method of item 16, wherein the transmission of the signal to the wireless communication devices uses a signal configuration communicated according to the method of any one of items 1 to 15, 18. The method of item 16 or 17, wherein the determination of the signal sequence comprises elementwise multiplication of a resource sequence with a group sequence.

19. The method of item 18, wherein the resource sequence is a Zadoff-Chu sequence which is elementwise multiplied with a scrambling code, wherein an initialisation index of the Zadoff-Chu sequence is based on the allocated resource.

20. The method of item 18 or 19, wherein the group sequence is an elementwise resource phase shift based on the group.

21. The method of item 18 or 19, wherein the group sequence is a Gold scrambling code based on the group.

22. The method of item 18 or 19, wherein the group sequence is a time-frequency short orthogonal code based on the group.

23. The method of any one of items 16 to 22, wherein the received paging message comprises any of device identity;

service information; and paging rate.

24. The method of any one of items 16 to 23, wherein the transmitted signal comprises a wake-up signal.

25. A computer program comprising instructions which, when executed on a processor of a network node, causes the network node to perform the method according to any one of items 1 to 24.

26. A method of a wireless communication device, the method being for reception of signal configurations from a network node and comprising wirelessly receiving information about a signal configuration in a system information message transmitted to a plurality of groups of wireless devices mutually having different resource allocations; and determining a first resource allocation for the wireless communication device from the received signal configuration.

27. The method of item 26, wherein the wirelessly receiving of the system information message comprises receiving a broadcast message, or receiving a dedicated radio resource control message.

28. The method of item 26 or 27, wherein the first resource allocation and a second resource allocation targeting other wireless devices comprises two resource allocations on same frequency and adjacent in time;

two resource allocations on same time and adjacent in frequency; or two resource allocations adjacent in time and frequency.

29. The method of any one of items 26 to 28, wherein the wireless communication device belongs to a first group, and the wireless transmission of the information about the signal configurations includes information about a number of used groups.

30. The method of item 29, wherein the information about number of groups represents any of a number of groups per resource allocation; and
a number of groups for all resource allocations.

31. The method of any one of items 26 to 30, wherein the signal configuration comprises a resource sequence for respective resource allocation, and the wirelessly receiving information about the signal configurations in a system information message comprises receiving indications on the used resource sequence.

32. The method of item 31, wherein the resource sequence is a Zadoff-Chu sequence which is elementwise multiplied with a scrambling code, where an initialisation index of the Zadoff-Chu sequence is included in the indication on the used resource sequence.

33. The method of item 32, wherein the indication on the used resource sequence comprises information about any of
a phase shift of the resource sequence;
an element shift of the resource sequence; and
an element-to-resource element mapping permutation of the resource sequence.

34. A method of a wireless device, the method being for reception of a signal from a network node and comprising
determining a signal configuration;
determining a resource allocation and a group from the network configuration;
determining a signal sequence to be attentive to based on the resource allocation and the group;
wirelessly receiving available signals; and
detecting the signal among received signals by identifying the signal sequence at the determined resource allocation.

35. The method of item 34, wherein the determining of the network configuration comprises receiving the network configuration according to the method of any one of items 26 to 33.

36. The method of item 34 or 35, wherein the determining of the sequence to be attentive to comprises elementwise multiplying a resource sequence with a group sequence.

37. The method of item 36, wherein the resource sequence is a Zadoff-Chu sequence which is elementwise multiplied with a scrambling code, wherein an initialisation index of the Zadoff-Chu sequence is based on the allocated resource.

38. The method of item 36, wherein the signal configuration comprises a resource sequence for respective resource allocation, and a differentiation between the resource sequences comprises any of
a phase shift of the resource sequence;
an element shift of the resource sequence; and
an element-to-resource element mapping permutation of the resource sequence.

39. The method of any one of items 36 to 38, wherein the group sequence is an elementwise resource phase shift based on the group.

40. The method of any one of items 36 to 38, wherein the group sequence is a Gold scrambling code based on the group.

41. The method of any one of items 36 to 38, wherein the group sequence is a time-frequency short orthogonal code based on the group.

42. The method of any one of items 34 to 41, wherein the received signal comprises a wake-up signal.

43. A computer program comprising instructions which, when executed on a processor of a wireless communication device, causes the wireless communication device to perform the method according to any one of items 26 to 42.

44. A network node arranged for wireless communication with wireless communication devices comprising circuitry arranged to perform the method of any one of items 1 to 24.

45. A wireless communication device comprising circuitry arranged to perform the method of any one of items 26 to 42.

The invention claimed is:

1. A method of a network node arranged for wireless communication with wireless communication devices, the method being for transmission of a signal to the wireless communication devices, the method comprising:
prior to receiving a paging message from another network node, providing a signal configuration to the wireless communication devices by:
determining a first resource allocation and a second resource allocation to use for the signal configuration, the first resource allocation being different and adjacent in at least one of time and frequency from the second resource allocation;
determining a first group and a second group of wireless communication devices, the first resource allocation being allocated to the first group of wireless communication devices and the second resource allocation being allocated to the second group of wireless communication devices; and
wirelessly transmitting information about the signal configuration as a system information message to the first and second groups of wireless communication devices;
receiving, from the another network node, the paging message intended for a wireless communication device belonging to a first group of wireless communication devices;
determining, from the received paging message, a signal resource allocation and the group of the wireless communication devices;
determining a signal sequence based on the determined signal resource allocation and the group of the wireless communication devices; and
transmitting the signal comprising the determined signal sequence using the determined signal resource allocation.

2. The method of claim 1, wherein the signal sequence comprises an elementwise multiplication of a resource sequence with a group sequence.

3. The method of claim 2, wherein the resource sequence is a Zadoff-Chu sequence which is elementwise multiplied with a scrambling sequence, wherein an initialisation of the scrambling sequence is determined based on the allocated resource.

4. The method of claim 2, wherein the group sequence is an elementwise phase shift based on the group.

5. The method of claim 1, wherein the received paging message comprises any of:
device identity;
service information; and
paging rate.

6. The method of claim 1, wherein the transmitted signal comprises a wake-up signal.

7. The method of claim 1, wherein the wirelessly transmitting of the system information message comprises one of:

transmitting a broadcast message; and
transmitting a dedicated radio resource control message.

8. The method of claim 1, wherein the first and second resource allocation comprises one of:
two resource allocations on same frequency and adjacent in time;
two resource allocations on same time and adjacent in frequency; and
two resource allocations adjacent in time and frequency.

9. The method of claim 1, wherein the determining of the first and second resource allocations comprises receiving information about the allocations from another network node.

10. The method of claim 1, wherein the determining of the first and second resource allocations comprises retrieving the information about the allocations from a memory storage.

11. The method of claim 1, comprising determining a number of groups to use, wherein the wireless transmission of the information about the signal configuration includes information about number of groups.

12. The method of claim 11, wherein the determining of the number of groups to use comprises receiving information about the number of groups to use from another network node.

13. The method of claim 11, wherein the determining of the number of groups to use comprises retrieving the information about the number of groups to use from a memory storage.

14. The method of claim 11, wherein the information about number of groups represents any of:
a number of groups per resource allocation; and
a number of groups for all resource allocations.

15. The method of claim 1, wherein the signal configuration comprises a resource sequence for respective resource allocation, and the wirelessly transmitting information about the signal configuration as a system information message to the first and second groups of wireless devices also comprises indications on the used resource sequences.

16. The method of claim 1, wherein the signal configuration comprises a resource sequence which is a Zadoff-Chu sequence which is elementwise multiplied with a scrambling sequence, where an initialisation of the scrambling sequence is determined based on the first and second resource allocations, respectively.

17. The method of claim 1, wherein the signal configuration is a signal configuration for a wake-up signal.

18. A method of a wireless device, the method being for reception of a signal from a network node, the method comprising:
wirelessly receiving information about a signal configuration in a system information message that is transmitted by the network node prior to the network node receiving a paging message from another network node;
determining a resource allocation and a group to which the wireless device belongs based on the information about the signal configuration, the resource allocation being different and adjacent in at least one of time and frequency from another resource allocation allocated to a second group of wireless devices;
determining a signal sequence to be attentive to based on the resource allocation and the group;
wirelessly receiving available signals; and
detecting the signal among received signals by identifying the signal sequence at the determined resource allocation.

19. The method of claim 18, wherein the sequence to be attentive to comprises an elementwise multiplication of a resource sequence with a group sequence.

20. The method of claim 19, wherein the group sequence is an elementwise phase shift based on the group.

21. The method of claim 19, wherein the resource sequence is a Zadoff-Chu sequence which is elementwise multiplied with a scrambling sequence, wherein an initialisation of the scrambling sequence is determined based on the resource allocation.

22. The method of claim 18, wherein the received signal comprises a wake-up signal.

23. The method of claim 18, wherein the information about the signal configurations includes information about a number of used groups.

24. The method of claim 23, wherein the information about a number of used groups represents any of:
a number of groups per resource allocation; and
a number of groups for all resource allocations.

25. The method of claim 18, wherein the wirelessly receiving of the information about a signal configuration in a system information message comprises one of:
receiving a broadcast message; and
receiving a dedicated radio resource control message.

26. The method of claim 18, wherein the information about the signal configuration comprises a resource sequence for respective resource allocation, and the wirelessly receiving information about the signal configurations in a system information message comprises receiving indications on a used resource sequence.

27. A network node arranged for wireless communication with wireless communication devices comprising circuitry configured to:
prior to receiving a paging message from another network node, provide a signal configuration to the wireless communication devices by:
determining a first resource allocation and a second resource allocation to use for the signal configuration, the first resource allocation being different and adjacent in at least one of time and frequency from the second resource allocation;
determining a first group and a second group of wireless communication devices, the first resource allocation being allocated to the first group of wireless communication devices and the second resource allocation being allocated to the second group of wireless communication devices; and
wirelessly transmitting information about the signal configuration as a system information message to the first and second groups of wireless communication devices;
receive, from the another network node, the paging message intended for a wireless communication device belonging to a group of wireless communication devices;
determine, from the received paging message, a signal resource allocation and the group of the wireless communication devices;
determine a signal sequence based on the determined signal resource allocation and the group of the wireless communication devices; and
transmit the signal comprising the determined signal sequence using the determined signal resource allocation.

28. A wireless communication device comprising circuitry configured to:

wirelessly receive information about a signal configuration in a system information message that is transmitted by a network node prior to the network node receiving a paging message from another network node;

determine a resource allocation and a group to which the wireless device belongs based on the information about the signal configuration, the resource allocation being different and adjacent in at least one of time and frequency from another resource allocation allocated to a second group of wireless devices;

determine a signal sequence to be attentive to based on the resource allocation and the group;

wirelessly receive available signals; and detect the signal among received signals by identifying the signal sequence at the determined resource allocation.

\* \* \* \* \*